July 6, 1926.

O. G. MANDT

WAGON LOADER

Filed Jan. 14, 1925

WITNESSES
W. A. Williams

INVENTOR
O. G. Mandt
BY
ATTORNEYS

July 6, 1926.

O. G. MANDT 1,591,635

WAGON LOADER

Filed Jan. 14, 1925 3 Sheets-Sheet 3

WITNESSES
W. A. Williams

INVENTOR
O. G. Mandt.
BY
ATTORNEYS

Patented July 6, 1926.

1,591,635

UNITED STATES PATENT OFFICE.

OBERT GISERD MANDT, OF KEOKUK, IOWA, ASSIGNOR TO MANDT CONSTRUCTION EQUIPMENT CORPORATION, OF KEOKUK, IOWA, A CORPORATION OF IOWA.

WAGON LOADER.

Application filed January 14, 1925. Serial No. 2,354.

This invention relates to wagon loaders adapted to be attached to a tractor or incorporated in a portable machine using its own power unit.

An object of the invention is the provision of a device constituting a frame which is adapted to be incorporated as a unit on any form of tractor for carrying movable arms adapted to be oscillated for lifting a load.

Another object of the invention is the provision of a unitary structure constituting a frame adapted to be applied to a tractor and having oscillating arms pivotally supported by a rotatable carriage, the pivotal point of the arms on the carriage being rotated to one side of the point or post about which the carriage rotates.

A further object of the invention is the provision of a unitary structure including a frame and having a rotatable carriage supporting pivotally mounted lifting arms, the rotation of the carriage and the actuation of the lifting arms being effected through the power plant of the tractor with means for automatically cutting off the power to the rotatable carriage at predetermined points in the rotation of the carriage.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side elevation of my lifting device incorporated in a Fordson tractor.

Figure 2:
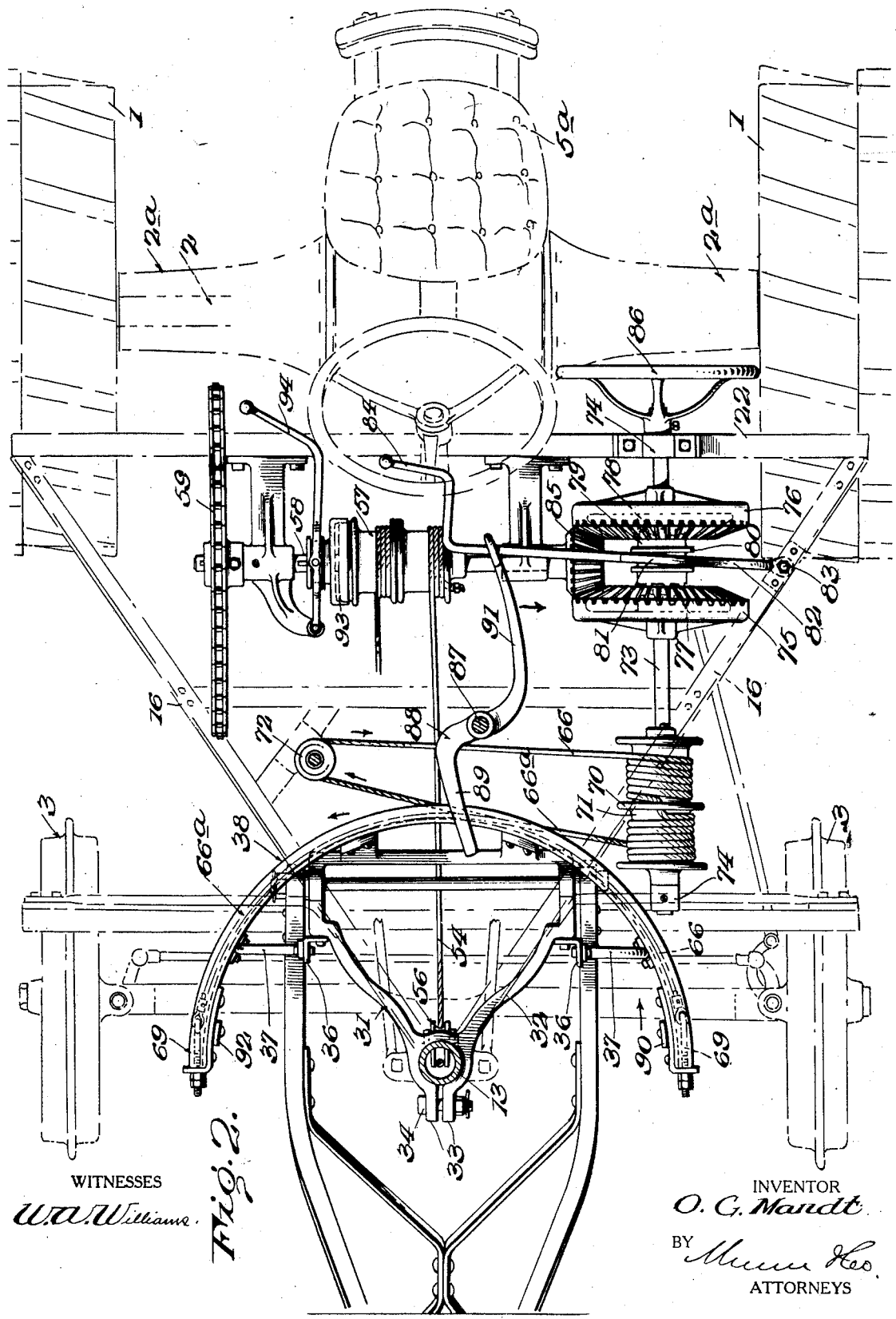
Figure 2 is a horizontal section of the lifting device, and tractor.
Figure 3:
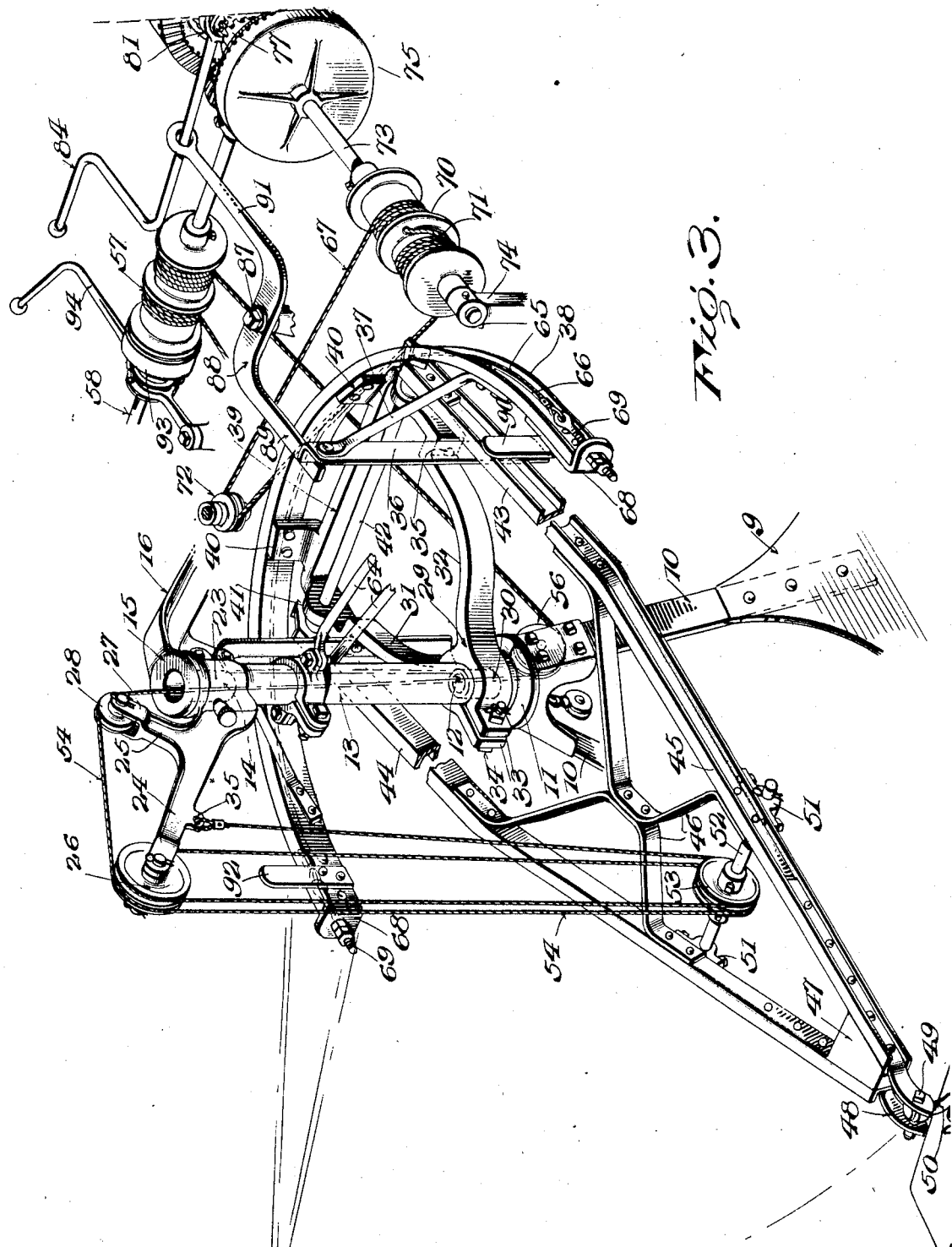
Figure 3 is a view in perspective showing a portion of the frame and lifting mechanism in detached relation with the tractor.

Referring more particularly to the drawings, 1 designates the rear wheels of a tractor mounted on a driving axle 2. Front wheels 3 of smaller diameter than the rear wheels are mounted forwardly of an engine 4 which constitutes the power plant of the tractor. A steering wheel 5 carried by a steering post 6 is located, as is usual, at a point adjacent the rear wheels 1 and a driver's seat 5ª.

A framework is provided which is removably mounted upon the tractor and includes a pair of rails 7 extending longitudinally of the tractor and upon opposite sides of the power plant 4 and have their rear ends connected by means of clamps and bolts to the rear axle housing 2ª. The forward ends of the rails 7 are connected in any approved manner to the chassis of the tractor.

The forward end of the rails 7 are bent downwardly as shown at 7ª and are connected together by a bar 8 which forms a rest or abutment when a shovel is employed in connection with the tractor. To each rail 7 and adjacent the bent portions 7ª is secured a bracket plate 9. Standards 10 which support the bearing block 11 are secured at their lower ends to the plates 9.

A pin 12 rigidly connected with the block 11 is adapted to receive the lower end of a hollow revolving clamp or post 13. A bearing pin 14 projecting downwardly from a head 15 is inserted within the upper hollow end of the post 13. Pin 14 and head 15 are carried by a pair of bracket arms 16 which extend rearwardly and downwardly and are secured as shown at 17 to the upper ends of a pair of uprights 18 carried by the beams 7. Another pair of spaced uprights 19 secured at their lower ends to the horizontal beam 7 adapted to cooperate with the uprights 18 for supporting longitudinal bars 20. Bars 21 connect the beams 20 and 7 together and aid in reinforcing the framework as applied to the tractor.

As shown more particularly in Figure 2 the arms or brace bars 16 are disposed at an acute angle to each other and diverged toward the rear end of the tractor where they are connected to the uprights 18 by means of the horizontal angle irons 22.

A sleeve 23 is rigidly connected with the upper end of the revolving post 13 and is provided with a pair of arms 24 and 25, the arm 24 extending forwardly and carrying at its outer forked end a sheath 26 having a plurality of cable receiving grooves. The arm 25 extends at substantially a right angle to the arm 24 and carries at its outer forked end 27 a sheath 28. Rigidly clamped to the lower end of the post 13 adjacent the bearing cable or block 11 is a fork 29 in the form of a split sleeve 30 and a pair of divergent curved arms 31 and 32. Perforated flanges 33 are connected with the split ends of the sleeve 30 and a bolt 34 cooperates for locking the sleeve rigidly with the post 13. Adjacent the outer ends of the arms 31 and 32 is formed an offset portion 35 forming a seat to which is bolted a vertically disposed angle iron 36. To each of the arms 31 and 36 is secured an angle iron 36 and a brace bar 37, secured to the upper end of the angle iron 36, is carried downwardly and outwardly and secured to an outer free end of an arcuately shaped bull ring 38.

A transverse bar 39 connects the inner ends of the arms 31 and 32 and is provided with standing lugs 40 bolted to the rear face of the bull ring 38. The arms 31 and 32 are further provided with an enlargement 41 adjacent their ends which is perforated to receive a rod 42. Upon the outer projecting end of the rod 42 are pivotally mounted a pair of spaced lifting arms 43 and 44. These arms straddle the post 13 and are bent inwardly as shown at 45 and are connected together and thus reinforced by a pair of bars 46. The outer extreme ends of the arms 43 and 44 are connected together by means of a block 47 from which projects a pair of lugs 48 carrying a pin 49 upon which is pivotally mounted a hook 50.

To the arms 43 and 44 at an intermediate point along the inbent portion 45 are rigidly secured bearings 51 in which is mounted a rod 52. Rigidly secured to said rod is a grooved pulley 53 upon which a cable 54 is entrained. One end of the cable is connected to a perforated lug 55 depending from the arm 24. The cable is provided with several convolutions between the grooved pulleys 26 and 53 and then is finally carried over the pulley 28 down through the hollow post 13 entrained about a pulley 56 then it is carried rearwardly and connected to a hoisting drum 57. The hoisting drum is driven by a shaft 58 which in turn is driven by a sprocket 59 mounted in a casing at one side of the tractor.

A chain 60 operatively connects the sprocket 61 with sprocket 59, the sprocket 61 being mounted upon the usual driving shaft 62 which projects outwardly from one side of the tractor and is connected with the power plant 4.

For further reinforcing the post 13 a collar 63 is clamped to said post intermediate its end and bracket arms 64 are carried downwardly from said collar and connected to the arms 43 and 44.

The bull ring 38 is provided with a groove 65 on its outer face in which is adapted to be mounted the ends 66 and 66ª of a cable 67. At the outer ends of said ring are secured perforated attaching plates 68 through which are threaded eye bolts 69 and locked thereto by the usual nuts, the ends of the cable 66 and 66ª being secured to the eye bolts. The cable 67 is passed through a perforation in a flange 70 which is formed intermediate the ends of a pulley 71. The opposite ends of the cable are then wrapped in the opposite direction around the pulley with the end 66 being entrained about a horizontal pulley 72 and then carried, as shown in Figure 2 in the groove 65 of the bull ring 38 and secured to the eye bolt 69. The other end 66ª of said cable is brought from beneath the pulley 71 and carried to the other end of the bull ring and to the respective eye bolts 69, the cable 66, as shown, is carried from the top of the pulley 71.

The pulley 71 is driven by a shaft 73 mounted in bearings 74. Loose on the shaft 73 are a pair of gears 75 and 76. Each of the gears has an inner element 77 of a dog clutch which is adapted to be engaged by the element 78 of the sliding member 79. The sleeve 79 is provided with a groove 80 which is adapted to be engaged by a fork 81 carried by an oscillating arm 82 pivoted at 83 on the brace rod 16. The sleeve 79 while slidable on the shaft 73 is locked to the shaft 73 by a key so that when the handle 84 connected with the arm 82 is oscillated either the gear 75 or the gear 76 is locked in driving relation with the shaft 73. A gear 85 driven by the shaft 68 is adapted to constantly mesh with either gear 75 or 76. The shaft 73 projects beyond the horizontal bar 22 of the frame and is provided with a hand lever 86 adapted when operated to act as a brake on the shaft 73 and likewise upon the lateral swinging of the lifting arms 43 and 44.

Pivotally carried by the frame, as shown at 87, is a bell crank lever 88. Said bell crank lever has an arm 89 adapted to project above the bull ring 38 so that when the bull ring is moved in the direction indicated by the arrow in Figure 2 an upstanding lug 90 will engage the arm 89 and rock the bell crank lever 88, causing the arm 91 to be moved in the direction indicated by the arrow, thereby oscillating the arm 82 to a neutral position whereby the element 78 of the sleeve 79 will be disengaged from the clutch element of the gear 75.

The bull ring at its other free end has a lug 92 which when the ring 38 is moved in the opposite direction indicated by the arrow in Figure 2, will engage the arm 89 of the bell crank lever 88 and move the same to a neutral position when the arm 89 is located at an acute angle to the line passing through the post 13 and the steering column of the tractor. The drum 57 is loose on the shaft 58 and is adapted to be connected rigidly with said shaft by means of a clutch member 93 operated by an arm 94 which is placed in a convenient position adjacent the seat of the driver of the tractor.

The operation of my device is as follows: Shaft 58 is driven through the usual driving connections of a Fordson tractor as shown by shaft 62 by means of the shoes 50 and sprockets 59 and 61. The uplifting arms which form a unit, are positioned as desired for the purpose of lifting certain weights, thus if the load were disposed directly in front of the tractor the lifting arms would be positioned forwardly and the hook 50 would engage a chain which was connected with the load. The clutch 93 will then be thrown into operative position for locking the drum 57 to the shaft 58 whereby the drum will be operated to lift the arms and the load through the cable 54. As soon as the load is raised to the proper elevation the clutch arm 82 will be actuated in order to shift the sleeve 79 in the direction for either causing the drum 71 to unwind one of the ends of the cable 67 or the other end as may be necessary for revolving the post 13 and the bull ring 38 in a direction to properly locate the load at either side of the machine. By moving the sleeve 79 to cause its clutch element to engage the gear 76 the bull ring is revolved in the direction indicated by the arrow in Figure 2 and the shifting arm will be positioned to the left of the machine. The clutch element of the sleeve 79 with the gear 75 will cause a reverse rotation of the bull ring and thereby shift the lifting arms to the right of the tractor.

It will be appreciated that by pivotally supporting the arms 43 and 44 at a point which is to one side of the post 13 and over the central portion of the tractor that another arm may be employed for lifting and thereby a greater height may be attained in lifting the clutch and furthermore the shifting of the pivotal point of the lifting arms to a position which is intermediate the ends of the tractor and to one side of the supporting and revolving post 13, all danger of upsetting the tractor is eliminated and therefore considerable loads may be lifted and carried by the oscillating and revolving arms 43 and 44.

What I claim is:

1. In a device of the character described, a frame, a post mounted for rotation on the frame, a bracket composed of a pair of converging arms having a clamp at the inner ends thereof secured to the post, a transverse bar connected to the free end of the arms, lugs projecting upwardly from the transverse bar, a bull ring secured to the upper end of the lugs, a boom pivoted to the free ends of the arms, and means for raising said boom, and means for rotating the bull ring in opposite directions.

2. In a device of the character described, a frame, a post mounted for rotation on the frame, a bracket having one end rigid with the post, a bull ring carried by the bracket, a boom pivoted to the free end of the bracket, means providing a journal for the upper end of the post, and pulleys, a cable connected between the bull ring and pulleys for rotating the bull ring in opposite directions, a power driven shaft for rotating the pulleys, gears for driving the shaft in opposite directions, a clutch device for controlling the gears, a lever for controlling the clutch and stops on the bull ring adapted to engage the lever and shift said lever to neutral position when the boom has been moved to either side of the frame.

OBERT GISERD MANDT.